B. CLARK.
Churn.

No. 203,419. Patented May 7, 1878.

Witnesses.
S. N. Piper
L. W. Miller

Inventor
Beeri Clark.
by his attorney
R. H. Eddy

UNITED STATES PATENT OFFICE.

BEERI CLARK, OF WALPOLE, MASSACHUSETTS.

IMPROVEMENT IN CHURNS.

Specification forming part of Letters Patent No. 203,419, dated May 7, 1878; application filed April 16, 1878.

*To all whom it may concern:*

Be it known that I, BEERI CLARK, of Walpole, of the county of Norfolk and State of Massachusetts, have invented a new and useful Improvement in Churns; and do hereby declare the same to be described in the following specification and represented in the accompanying drawings, of which—

Figure 1:
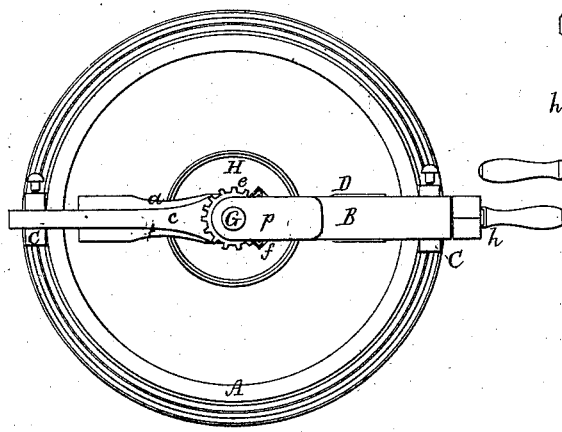
Figure 2:
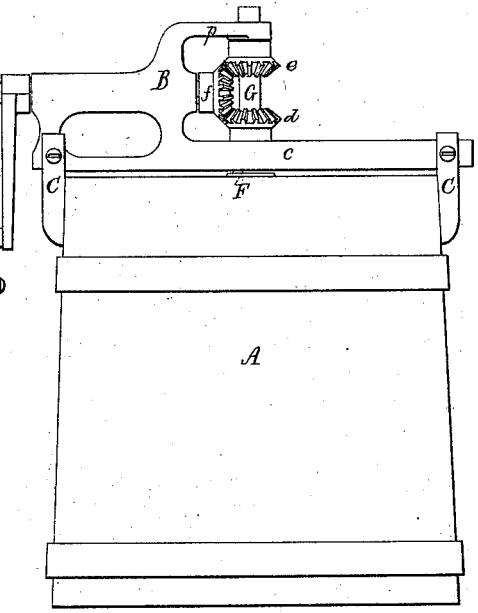
Figure 3:
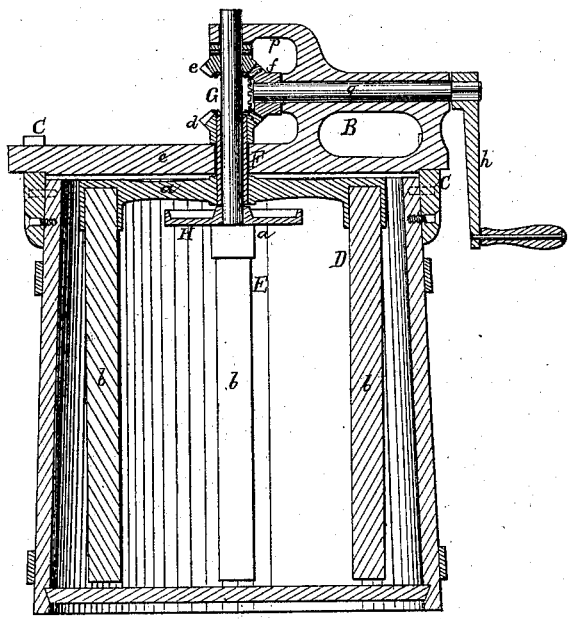
Figure 4:
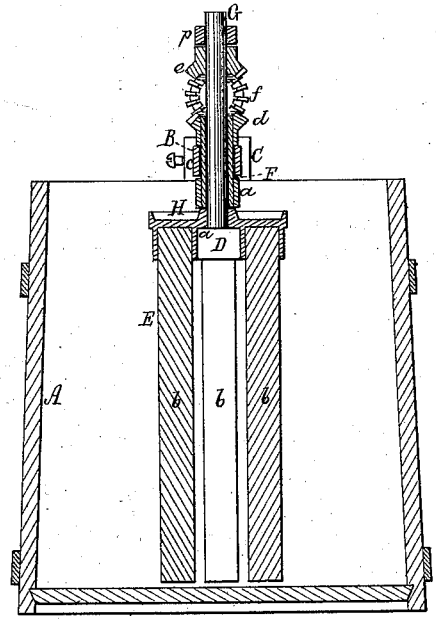

Figure 1 is a top view, Fig. 2 a side elevation, and Figs. 3 and 4 transverse and vertical sections, of a churn provided with my invention.

This churn has two rotary dashers, one of which is arranged within and revolves independently of the other. These dashers and their operative mechanism are arranged and combined with a frame extending diametrically across the mouth or top of the tub, and resting in socketed projections fixed thereto. Furthermore, there is arranged and combined with the dashers, their operative mechanism, and sustaining-frame, a circular dish, the special objects of which are to prevent cream from being thrown up into the dasher-bearings, and also to intercept any oil that may escape therefrom and be liable to fall into the tub or cream when the churn may be in operation.

In the drawings, A denotes a churn-tub, having extended diametrically across its mouth a frame, B, formed as represented, and inserted in socketed projections C C, fixed to the tub. Below the said frame B are the two rotary dashers D E, each of which is composed of a horizontal bar, $a$, and two legs, $b\ b$, extending down therefrom, in manner as represented.

From the middle of the bar $a$ of the larger dasher D a tubular shaft, F, extends upward through and takes a bearing in the lower bar $c$ of the frame B, and has a bevel-gear, $d$, fixed on its upper end. From the middle of the smaller dasher a shaft, G, extends upward through the shaft F, and takes a bearing therein, and in the upper part $p$ of the frame B. There is fixed to the shaft G a bevel-gear, $e$, which, with the gear $d$, engages with another and intermediate bevel-gear, $f$, fixed on a horizontal shaft, $g$, arranged in the frame B, and provided with a crank, $h$, as represented.

Furthermore, there is fixed on the top of the inner or lesser dasher E a circular dish, H, which is arranged below the head or upper bar of the larger dasher, and projects from the smaller dasher laterally, in manner as represented.

On revolving the crank the two dashers will be put in revolution in opposite directions relatively to each other. The cap will not only prevent oil from the bearings of the dasher-shaft working down into the cream in the tub, but will suffice to prevent the cream from surging up or swashing into such bearings on a sudden stoppage of the dashers.

By supporting both dashers and their operative mechanism by the frame extended diametrically across the top of the tub, it becomes an easy matter to remove the dashers from the tub without disturbing their connection. Thus they and the tub can be easily separated to facilitate the washing or churning of either.

I do not claim in a churn two rotary dashers to revolve independently of each other; but

I claim—

The combination and arrangement of the circular dish with the two rotary dashers, their operative mechanism, and supporting-frame, all being substantially as shown and described.

BEERI CLARK.

Witnesses:
R. H. EDDY,
JOHN R. SNOW.